May 13, 1952     G. E. WISE     2,596,883

FISH LURE

Filed June 25, 1949

Gary E. Wise
INVENTOR.

BY Slough & Slough
His Attorneys

Patented May 13, 1952

2,596,883

UNITED STATES PATENT OFFICE 2,596,883

FISH LURE

Gary E. Wise, Cleveland, Ohio, assignor to Holdenline Company, Cleveland, Ohio, a corporation of Ohio Application June 25, 1949, Serial No. 101,351

4 Claims. (Cl. 43—42.33)

My invention relates to an improved fish lure and more particularly relates to lures of the type molded from plastic composition or like material.

It is an object of the present invention to so construct upper and lower body portions of the improved lure of my invention as to increase the attractive effect of desired markings and colorings and to give a more life-like appearance to the lure when the same is cast and moving in the water.

A still further object of my invention is to provide an improved lure which will be economical and efficient in manufacture, as well as highly effective and attractive in use.

Other objects of my invention and the invention itself will become more apparent by reference to the following description and drawings, in which drawings.

Figure 1:
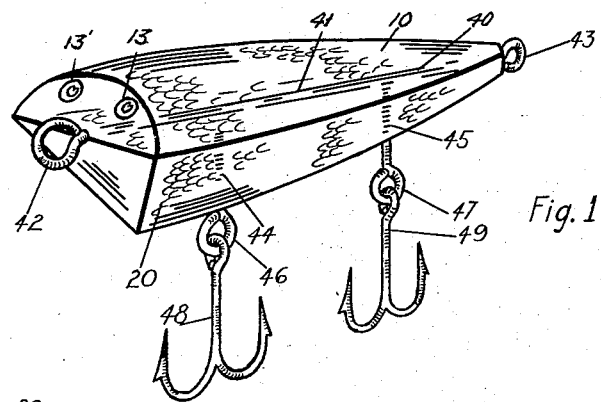
Fig. 1 is a perspective view of the improved fish lure of my invention.
Figure 2:
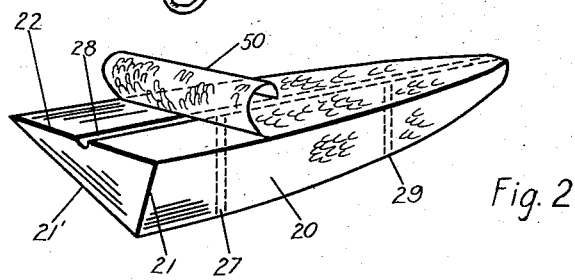
Fig. 2 is a perspective view of the lure body portion of the lure of my invention showing a film applied thereto being rolled back a slight distance to more clearly disclose added inventive matter in said bottom body portion, dotted lines disclosing passageways of grooves therein.
Figure 3:
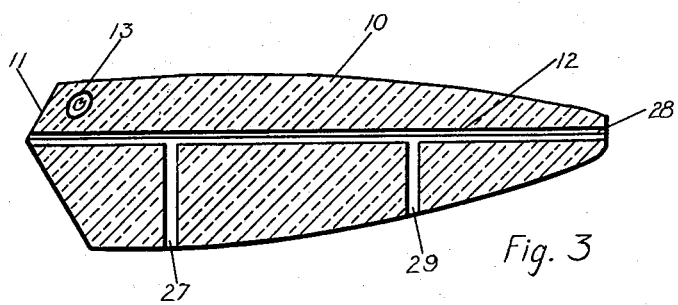
Fig. 3 is essentially an enlarged longitudinal sectional view through the line shown in Fig. 1.

Referring to the drawings, in all of which like parts are designated by like reference characters, the improved lure of my invention is preferably constructed of a pair of body sections 10 and 20, both sections preferably being formed of plastic material, said material being generally translucent or, at least, semi-transparent.

The upper body portion 10 is formed with an arcuate external surface, said surface being generally curved downwardly from the forward portion thereof to the rear or tail end of the lure and having its forward or head portion 11 slanted forwardly at an angle of approximately 60° to the axis of the lure. The upper body portion, in this form of my invention, is preferably solid with a flat under surface 12 which overlies the upper surface of the lower body portion.

The external surface of the body portion 10, as hereinbefore described, is curved and approximates the arc of a circle thus forming a vertical condensing lens for material disposed internally of the lure, as hereinafter described, and gives an apparent internal movement to such markings or interposed material when the lure is in motion, in action, changing the aspects of vision.

Fish eyes 13 and 13' are formed either internally or externally on the head portion of the lure and are tinted or stained, for added novel effect.

The lower body portion 20, of the lure of my invention, is prismatically formed generally in the form of an isoceles triangle, as viewed in cross section, and is of substantially solid transparent material such as acrylic plastic or the like, having external faces 21 and 21' disposed at an angle of approximately 60° to 90° to the axis of the lure.

The bottom portion 20 of the lure is provided with a generally flat upper surface 22 in which is formed a longitudinal groove 28 extending throughout the length of said portion 20. The vertical bores 27 and 29 extend from the grooves 28 downwardly through the bottom portion 20. A line and hook securing member 40 comprising a rod 41 is disposed in the groove 28 and is formed at its ends with the eyelets 42 and 43. Hook securing pendent stem portions 44 and 45 are disposed in the vertical bores 27 and 29 and are provided with eyelets 46 and 47 respectively to which the hooks 48 and 49 are secured.

The eyelet 42 is provided for attaching a fish line to the lure and the eyelet 43 is provided either to form a closure in connection with the eyelet 41 for retaining the entire hook assembly in the fish lure or for the additive purpose of attaching another lure or other hook means to the lure, as desired by the fisherman.

Interposed between the lower body portion 20 and the upper body portion 10, I provide a film 50 generally elongated and approximating the size and contour of the flat upper surfaces of the lower portion and the flat under surfaces of the upper portion.

The film 50 may be in the form of what is known as a decalcomania transfer or may be of some other type film such as acetate or the like on which has been printed in color the characteristic markings of a fish for the specific use of the lure, or the coloring or marking may be directly planed on the planular surfaces of the lower or upper body portions. Further, the coloring may be planed in intaglio through either such surface.

Figure 4:
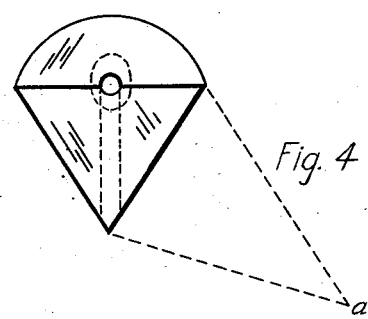
Fig. 4 is a front end view of the lure of my invention.

When the lure is viewed from position "A" (see Fig. 4), the markings on the film, due to refraction of the prismatic body 20, appear in a form simulating a fish body, as best viewed in Fig.

1. Further, by doubling refraction, due to the angle of divergence of faces 20 and 21', this view gives substantially a double vision; therefore the lure appears to be two fish.

As the view is slightly altered of the relative position of the eye to the face of the prism, the upper portion 10 of the body being of substantially transparent or like material and of curved formation permits the film to be viewed therethrough, but due to the arcuate form of the external surface of the upper portion, the film is magnified in appearance.

It can therefore be seen that the lure, when used to attract fish, appears in constant motion and gives a constantly changing appearance. As the viewing angle changes with respect to the faces 21 and 21' and to the external surface of the upper portion 10, it is apparent that such varying illusions give the effect of a single fish or of several fish and at all times of a moving fish, this being of considerably attractiveness in attracting fish to the lure.

The longitudinally disposed groove 28 also gives the added effect of a fish spine.

In manufacturing the lure, the central member 40 is laid in the groove 28, the dependent stems 44 and 45 being projected through the bores 27 and 29, eyelets being formed on the end of said stem portions after first securing hook means thereto.

The film 50 is then placed over the flat upper surface of the prismatic lower member and cemented or otherwise fastened thereto. The upper body member is then placed over said film and secured thereto and the upper portion intermediate film and central member and lower portion are secured together.

While I have described in connection with my invention a preferred embodiment, I am aware that various changes may be made therefrom without, however, departing from the spirit of my invention and the scope of the appended claims.

I claim:

1. In a fish lure including a body and hooks, said body comprising a translucent upper body portion forming a condensing lens and having a curved external surface and being generally tapered from a forward portion thereof to the rearmost portion thereof, a forward head portion thereof being slanted at an angle of approximately 60° to the axis of the lure, said upper portion having a flat under surface subtending the arc of the external surface, and an isosceles triangular prismatically formed translucent lower body portion having a generally flat upper surface, and means for securing said upper and lower portions together.

2. In a fish line including a body and hooks, said body comprising a translucent upper body portion having a curved external surface and being generally tapered from a forward portion thereof to the rearmost portion thereof, said upper portion having a flat under surface subtending the arc of the external surface, and a triangular prismatically formed translucent lower body portion having a generally flat upper surface, the side faces of said lower body portion converging to form the apex of the prism, and means having thereon characteristic markings of a fish, said means being interposed between the upper and lower body portions, and means for securing said upper and lower portions together.

3. A fish lure comprising a translucent upper body portion having a curved external surface and being generally tapered from a forward portion thereof to the rearmost portion thereof, said upper portion having a flat under surface subtending the arc of the external surface, a prismatically formed translucent lower body portion having a generally flat upper surface, said upper surface of said lower body portion having a longitudinally extending groove disposed therein, having bores disposed vertically therein and cooperating with said longitudinally disposed groove, hook attachment means disposed in said longitudinally disposed groove and vertically extending bores, and means for securing said upper and lower portions together.

4. In a fish lure including a body and hooks, said body comprising a translucent upper body portion forming a condensing lens and having a curved external surface and being generally tapered from a forward portion thereof to the rearmost portion thereof, said upper portion having a flat under surface subtending the arc of the external surface, a prismatically formed translucent lower body portion having a generally flat upper surface, the side faces of said lower body portion converging and together with said flat upper surface forming a prism, and means having internal markings thereon in the lure being refracted in single and multiple images therethrough.

GARY E. WISE.

REFERENCES CITED

The following references are of record in the file of this patent:

UNITED STATES PATENTS

| Number | Name | Date |
| --- | --- | --- |
| 1,892,892 | Jamar, Jr. | Jan. 3, 1933 |
| 1,897,291 | Andrews | Feb. 14, 1933 |
| 2,006,604 | Post | July 2, 1935 |
| 2,008,437 | DeWitt | July 16, 1935 |